United States Patent
Fickle et al.

(10) Patent No.: US 9,027,063 B2
(45) Date of Patent: May 5, 2015

(54) VIDEO-ON-DEMAND (VOD) MANAGEMENT SYSTEM AND METHODS

(75) Inventors: Richard C. Fickle, Sedalia, CO (US); José A. Róyo, Venice, CA (US); Timothy Bruce Aron, Santa Monica, CA (US)

(73) Assignee: Deluxe Digital Distribution Inc., Burbank, CA (US)

( * ) Notice: Subject to any disclaimer, the term of this patent is extended or adjusted under 35 U.S.C. 154(b) by 13 days.

(21) Appl. No.: 10/718,376

(22) Filed: Nov. 19, 2003

(65) Prior Publication Data

US 2004/0103120 A1 May 27, 2004

Related U.S. Application Data

(60) Provisional application No. 60/429,966, filed on Nov. 27, 2002.

(51) Int. Cl.
*H04N 7/173* (2011.01)
*H04N 7/16* (2011.01)
(Continued)

(52) U.S. Cl.
CPC .............. *H04N 7/165* (2013.01); *G06Q 10/10* (2013.01); *H04N 21/2225* (2013.01);
(Continued)

(58) Field of Classification Search
USPC ........ 707/1, 3, 5, 8, 10, 100, 102–104.1, 200, 707/201; 705/1, 30, 34, 50–54, 57; 709/200–203, 217–219; 715/500, 715/500.1, 700, 716, 719; 725/1, 37–39, 725/74, 78, 82, 85, 86, 91–93, 105, 725/114–117, 131, 87, 46; 348/469, 473
See application file for complete search history.

(56) References Cited

U.S. PATENT DOCUMENTS 5,172,413 A  12/1992  Bradley et al.
5,488,714 A * 1/1996  Skidmore ............... 717/143
(Continued)

FOREIGN PATENT DOCUMENTS

JP   2006511989    4/2006
WO   99/29108 A1    6/1999
(Continued)

OTHER PUBLICATIONS

N2Broadband, "Creating Scalable Solutions for VOD . . . and Beyond", Sep. 28, 2002, http://web.archive.org/web/20021014085201/www.n2bb.com/prodsvc.asp.*

(Continued)

*Primary Examiner* — An Son P Huynh
(74) *Attorney, Agent, or Firm* — Fitch, Even, Tabin & Flannery LLP

(57) ABSTRACT

The present invention provides for closed loop multimedia content management systems and methods to ensure accurate and timely delivery of VOD content from multiple content providers using multiple distribution systems. The present invention provides for a method of distributing multimedia content using a VOD management system by receiving a multimedia asset data file and associated metadata from a content provider and/or a MSO, tracking the delivery of the multimedia asset data file to a MSO, tracking the upload of the multimedia asset data file to a VOD server maintained by the MSO, and providing usage reports relating to usage of multimedia asset data files by end users of the MSO. Usage reports are prepared by receiving data from the VOD servers regarding the files requested by end users, creating a master reporting database using that data, and generating the usage reports using the data contained in the master reporting database.

55 Claims, 6 Drawing Sheets

(51) Int. Cl.
| | |
|---|---|
| G06Q 10/10 | (2012.01) |
| H04N 21/2225 | (2011.01) |
| H04N 21/24 | (2011.01) |
| H04N 21/262 | (2011.01) |
| H04N 21/84 | (2011.01) |
| H04L 29/08 | (2006.01) |
| H04L 29/06 | (2006.01) |

(52) U.S. Cl.
CPC ........ *H04N 21/2407* (2013.01); *H04N 21/262* (2013.01); *H04N 21/84* (2013.01); *H04L 65/4084* (2013.01); *H04L 67/06* (2013.01); *H04L 67/22* (2013.01); *H04L 67/32* (2013.01); *H04L 67/28* (2013.01)

(56) References Cited

U.S. PATENT DOCUMENTS

| | | | |
|---|---|---|---|
| 5,600,573 A | 2/1997 | Hendricks et al. | |
| 5,710,887 A * | 1/1998 | Chelliah et al. | 705/26 |
| 5,748,956 A * | 5/1998 | Lafer et al. | 707/104.1 |
| 5,767,895 A | 6/1998 | Yashiro | |
| 5,864,871 A * | 1/1999 | Kitain et al. | 707/104.1 |
| 5,920,700 A | 7/1999 | Gordon et al. | |
| 5,923,361 A * | 7/1999 | Sutton, Jr. | 725/93 |
| 5,990,941 A | 11/1999 | Jackson et al. | |
| 5,995,973 A | 11/1999 | Daudenardé | |
| 6,014,644 A * | 1/2000 | Erickson | 705/37 |
| 6,041,354 A | 3/2000 | Biliris et al. | |
| 6,118,976 A | 9/2000 | Arias | |
| 6,151,321 A | 11/2000 | Benson | |
| 6,216,265 B1 | 4/2001 | Roop et al. | |
| 6,222,530 B1 | 4/2001 | Sequeira | |
| 6,305,019 B1 | 10/2001 | Dyer | |
| 6,335,927 B1 | 1/2002 | Elliott et al. | |
| 6,384,850 B1 | 5/2002 | McNally et al. | |
| 6,473,902 B1 * | 10/2002 | Noritomi | 725/91 |
| 6,477,707 B1 | 11/2002 | King | |
| 6,529,706 B1 | 3/2003 | Mitchell | |
| 6,621,870 B1 | 9/2003 | Gordon | |
| 6,850,252 B1 * | 2/2005 | Hoffberg | 715/716 |
| 6,882,793 B1 | 4/2005 | Fu | |
| 6,980,972 B1 * | 12/2005 | Allibhoy et al. | 705/51 |
| 7,010,801 B1 | 3/2006 | Jerding | |
| 7,024,681 B1 * | 4/2006 | Fransman et al. | 725/115 |
| 7,047,287 B2 * | 5/2006 | Sim et al. | 709/202 |
| 7,058,685 B1 * | 6/2006 | van Zee et al. | 709/202 |
| 7,065,213 B2 | 6/2006 | Pinder | |
| 7,065,779 B1 | 6/2006 | Crocker | |
| 7,080,400 B1 * | 7/2006 | Navar | 725/139 |
| 7,100,192 B1 * | 8/2006 | Igawa et al. | 725/112 |
| 7,107,606 B2 | 9/2006 | Lee | |
| 7,188,357 B1 * | 3/2007 | Rieschl et al. | 725/92 |
| 7,305,696 B2 * | 12/2007 | Thomas et al. | 725/114 |
| 7,434,242 B1 * | 10/2008 | Goode | 725/9 |
| 7,921,448 B2 | 4/2011 | Fickle | |
| 2001/0025255 A1 * | 9/2001 | Gaudian | 705/26 |
| 2002/0007402 A1 * | 1/2002 | Huston et al. | 709/217 |
| 2002/0013947 A1 * | 1/2002 | Russell et al. | 725/90 |
| 2002/0059394 A1 * | 5/2002 | Sanders | 709/217 |
| 2002/0059623 A1 | 5/2002 | Rodriguez | |
| 2002/0078174 A1 * | 6/2002 | Sim et al. | 709/219 |
| 2002/0083006 A1 * | 6/2002 | Headings et al. | 705/59 |
| 2002/0083148 A1 * | 6/2002 | Shaw et al. | 709/214 |
| 2002/0100059 A1 | 7/2002 | Buehl et al. | |
| 2002/0104093 A1 * | 8/2002 | Buehl et al. | 725/98 |
| 2002/0108121 A1 * | 8/2002 | Alao et al. | 725/110 |
| 2002/0143565 A1 * | 10/2002 | Headings et al. | 705/1 |
| 2002/0143782 A1 * | 10/2002 | Headings et al. | 707/100 |
| 2002/0143976 A1 * | 10/2002 | Barker et al. | 709/231 |
| 2002/0144262 A1 * | 10/2002 | Plotnick et al. | 725/32 |
| 2002/0144279 A1 | 10/2002 | Zhou | |
| 2002/0199200 A1 | 12/2002 | Addington | |
| 2003/0020744 A1 * | 1/2003 | Ellis et al. | 345/723 |
| 2003/0028890 A1 * | 2/2003 | Swart et al. | 725/91 |
| 2003/0028893 A1 | 2/2003 | Addington | |
| 2003/0028896 A1 * | 2/2003 | Swart et al. | 725/127 |
| 2003/0115454 A1 * | 6/2003 | Piikivi et al. | 705/77 |
| 2003/0120608 A1 | 6/2003 | Pereyra | |
| 2003/0149988 A1 * | 8/2003 | Ellis et al. | 725/87 |
| 2003/0204856 A1 * | 10/2003 | Buxton | 725/120 |
| 2003/0208767 A1 * | 11/2003 | Williamson et al. | 725/93 |
| 2004/0039754 A1 * | 2/2004 | Harple, Jr. | 707/104.1 |
| 2004/0046778 A1 * | 3/2004 | Niranjan et al. | 345/716 |
| 2004/0136698 A1 * | 7/2004 | Mock | 386/123 |
| 2004/0181801 A1 | 9/2004 | Hagen | |
| 2004/0205116 A1 * | 10/2004 | Pulier et al. | 709/203 |
| 2004/0226042 A1 | 11/2004 | Ellis | |
| 2004/0255335 A1 | 12/2004 | Fickle | |
| 2005/0149964 A1 * | 7/2005 | Thomas et al. | 725/9 |
| 2005/0165686 A1 * | 7/2005 | Zack et al. | 705/51 |
| 2005/0198677 A1 * | 9/2005 | Lewis | 725/87 |
| 2005/0283800 A1 * | 12/2005 | Ellis et al. | 725/40 |
| 2009/0138925 A1 * | 5/2009 | Headings et al. | 725/109 |
| 2009/0144154 A1 * | 6/2009 | Schein | 705/14 |

FOREIGN PATENT DOCUMENTS

| | | | | |
|---|---|---|---|---|
| WO | 2004051475 | | 6/2004 | |
| WO | WO 94/14283 | * | 9/2004 | H04N 7/16 |

OTHER PUBLICATIONS

U.S. Appl. No. 60/274,748—"Method and System for Managing Metadata Associated With Digital Video" filed Mar. 2001, 3 pages.*
N2BBroadband MediaPath Catcher, Jul. 3, 2003 website printout www.n2bb.com/mediapath_catcher.asp.
N2Broadband MediaPath Pitcher, Jul. 3, 2003 website printout www.n2bb.com/mediapath_pitcher.asp.
N2Broadband MediaPath Manager, Jul. 3, 2003 website printout www.n2bb.com/mediapath_manager.asp.
Skystream Networks, "Building Efficient Multicast Architectures for the Broadband Network", Jul. 18, 2003 website printout www.skystream.com/products/wp_multicast.asp.
Pathfire Enabling Digital Media, "Video-on-Demand Services".
Stump, Matt, Multichannel News, Jul. 15, 2002, "Comcast's Watson Cooks up VOD Centerpiece".
Digital Audio-Visual Council: "DAVIC 1.4.1 Specification Part 3: Service Provider System Architecture and Interfaces", Digital Audio Visual Council; http://www.davic.org, May 3, 2000.
Search Report EP 3809204: Date of completion Nov. 29, 2010.
Patent Cooperation Treaty; "International Search Report" issued in corresponding PCT Application No. PCT/US03/37868, mailed May 11, 2004, 3 pages.
USPTO; Final Office Action issued in U.S. Appl. No. 10/692,082, mailed Apr. 1, 2009, 25 pages.
USPTO; Notice of Allowance issued in U.S. Appl. No. 10/692,082, mailed Nov. 26, 2010, 8 pages.
USPTO; Office Action issued in U.S. Appl. No. 10/692,082, mailed Apr. 8, 2008, 28 pages.
USPTO; Office Action issued in U.S. Appl. No. 10/692,082, mailed Dec. 7, 2009, 17 pages.
USPTO; Office Action issued in U.S. Appl. No. 10/692,082, mailed Oct. 20, 2008, 22 pages.
USPTO; Office Action issued in U.S. Appl. No. 10/692,082, mailed Sep. 13, 2007, 30 pages.

* cited by examiner

VIDEO-ON-DEMAND (VOD) MANAGEMENT SYSTEM AND METHODS

CROSS-REFERENCE TO RELATED APPLICATIONS

This application claims benefit of provisional Application No. 60/429,966, filed Nov. 27, 2002, the disclosure of which is fully and expressly incorporated herein by reference.

FIELD OF THE INVENTION

The present invention relates to multimedia content distribution systems and methods, and specifically to multimedia content distribution systems and methods that manage the preparation, scheduling, and propagation processes for video-on-demand ("VOD") assets.

BACKGROUND

With the development of broadband technologies, cable and satellite television services are increasingly providing their customers with VOD services. In a typical VOD system, the cable or satellite multiple service/systems operator ("MSO") receives audiovisual content such as features, which may be movies, television shows, or other types of feature content, and the feature's associated previews and graphics files (a feature and its associated previews and graphics files may be collectively referred to herein as "content") from content providers, stores the content locally, and then transmits the content to a viewer upon the viewer's request. Content providers generally transmit content to MSOs via satellite transmissions or via a high-speed terrestrial-based network using appliances commonly referred to as pitchers. To receive the transmissions from the content providers, MSOs deploy a number of appliances commonly referred to as catchers. Catchers receive the transmissions from the content providers and, after receiving a complete file, relays the file to a VOD server. The VOD server then provides content to consumers of the MSO upon demand by the consumers.

Because a particular MSO will receive transmissions from a number of different content providers, each of whom may use different formats when transmitting their own content, problems may arise when the MSO attempts to process content prior to providing the content to its consumers. For example, file processing problems may arise due to extensible markup language ("XML") formatting issues, such as, e.g., a content provider may place metadata associated with the content in its files that the MSO's system regards as non-compliant data. As a result, metadata provided by various content providers may be inconsistent, unmanageable, or interpreted incorrectly when received by the MSO. Further, content providers and MSOs may use different and/or proprietary file transfer systems that may contribute to incompatibilities and transmission problems. Problems may also arise if a file contains corrupted data. As a result of the metadata issues as well as the file corruption issues, content may not be available on the VOD servers when scheduled.

Receiving data streams from many content providers has also limited the data available to a MSO that may be used to monitor the flow of VOD assets through its system. As a result, MSOs currently spend an inordinate amount of human resources to manually monitor and intervene with content management. The problem of a lack of visibility of the flow of VOD assets is also exacerbated by current content distribution schemes in which a content provider may independently operate the content input portion of the distribution process, third party aggregators, distributors, and other enablers operate the encoding and metadata management portion, the content upload portion, and the download to catchers portion of the distribution process, and the MSOs operate the content distribution to end users portion of the process. That is, currently, a content provider may be responsible for providing content and metadata, an aggregator, distributor, or other third party enabler may be responsible for combining the content and metadata, uploading the content to satellites, and then downloading the content to catcher appliances, and a MSO may be responsible for delivering content to its end users or consumers (references herein to "end users" are intended to refer to either an end user or a consumer). Because of the current lack of visibility of the flow of VOD assets, content management problems are difficult to isolate and resolve by the MSO, the content providers, or any other party in the content distribution chain.

Consequently, there is a need for systems and methods that allow a MSO and content providers to resolve transmission problems with regard to VOD content transmissions and to provide metadata that will comply with MSO requirements.

There is also a need for systems and methods that offer greater visibility and control over the transmission of VOD content, thereby allowing proactive monitoring of the assets being transmitted within the system.

There is also a need for systems and methods that offer greater visibility over the usage information of the content and that allow for proactive programming decisions based on the performance or usage of such content.

SUMMARY OF THE INVENTION

The present invention is directed to methods and systems for managing and delivering metadata while providing visibility and control over such metadata and the transmission of the content associated with such metadata as well as the usage information associated with such content.

In one aspect of the present invention a method of distributing content in the form of multimedia asset data files using a VOD management system is provided. A content provider and a MSO input the metadata associated with a multimedia asset data file into the VOD management system (unless otherwise noted, references herein to "metadata" refer to information of the associated multimedia asset data files as defined herein, such as, e.g., title, date of theatrical release, summary of plot, cast, and crew, Motion Picture Association of America ("MPAA") rating, length, price per view, scheduling information, other XML data desired by a MSO, and the like, which may be obtained from data entry over a web application, CableLabs XML, or ingestion of legacy media asset management databases). The VOD management system manages such. metadata. The MSO (and the content provider, to the extent permitted by the MSO) may access the metadata by accessing the VOD management system. The content provider then delivers the multimedia asset data file to a MSO via satellite or other distribution system, such as tape delivery, disk delivery, a local network, or a terrestrial-based network. The MSO (and the content provider, to the extent permitted by the MSO) may monitor such delivery using the VOD management system. After the file is delivered to the MSO, the VOD management system delivers a schedule to a VOD server instructing the VOD server to request the metadata from the VOD management system and requesting the multimedia asset data file from the catcher to which it has been delivered. Then, the file is uploaded to the VOD server maintained by the MSO. The MSO (and the content provider, to the extent permitted by the MSO) may monitor such delivery using the VOD management system. The VOD management system generates usage reports relating to the usage of the multimedia asset data files by the end users of the MSOs for use by the MSOs (and the content provider, to the extent permitted by the MSO) to manage the delivery of multimedia asset data files.

In another aspect of the present invention, a method of using a VOD management system to distribute multimedia asset data files from a plurality of content providers to a plurality of MSOs is provided. A plurality of content providers and a plurality of MSOs input metadata associated with a plurality of multimedia asset data files into the VOD management system. The VOD management system manages such metadata. The MSOs (and the content providers, to the extent permitted by each MSO) may access the metadata by accessing the VOD management system. A plurality of content providers then deliver a plurality of multimedia asset data files to a plurality of MSOs via satellite or other distribution system, such as tape delivery, disk delivery, a local network, or a terrestrial-based network. The MSOs (and the content providers, to the extent permitted by each MSO) may monitor such delivery using the VOD management system. After the plurality of files are delivered to the MSOs, the VOD management system delivers schedules to VOD servers instructing the VOD servers to request the metadata from the VOD management system and requesting the multimedia asset data files from the respective catchers to which the files have been delivered. Then, the files are uploaded to VOD servers maintained by the MSOs, preferably using an asset URL assigned to each file. The MSOs (and the content providers, to the extent permitted by each MSO) may monitor such delivery using the VOD management system. The VOD management system generates usage reports relating to the usage of the multimedia asset data files by the end-users of the MSOs for use by the MSOs (and the content providers, to the extent permitted by each MSO) to manage the delivery of multimedia asset data files.

These and other objects and features of the present invention will be appreciated upon consideration of the following drawings and description.

DETAILED DESCRIPTION

The present invention provides for closed loop VOD management systems and methods to ensure accurate and timely availability of VOD content from multiple content providers using multiple distribution systems.

In one implementation of a method of the present invention, four main functional components, a metadata ingestion component, a file distribution tracking component, a file upload tracking component, and a usage reporting component, enable a VOD management system to manage and distribute metadata and to track multimedia asset data files. All of the multimedia asset data files are tracked by a VOD management system 110, and may be assigned a unique workflow identification number to allow the VOD management system 110 to track the location and status of the file at any time. Communication between the functional components and the VOD management system 110 may be accomplished via simple request response messaging application program interfaces ("APIs"), or data exchanges using known XML formats.

Figure 1:
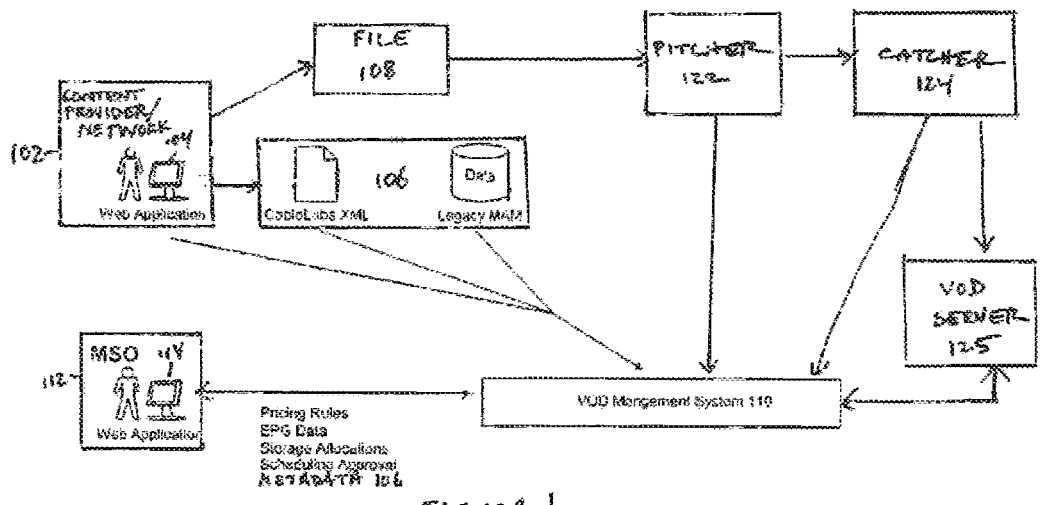
FIG. 1 is a schematic diagram of the components of a VOD management system of the present invention.

Using the methods of the present invention, metadata 106 and multimedia asset data files 108 from content providers and MSOs are ingested and validated. Turning to FIG. 1, the components required to implement the metadata ingestion functional component of a method of the present invention are illustrated. A VOD management system 110 is configured to accept data and instructions from content providers or content networks 102 (unless otherwise noted, references herein to "content provider" are intended to refer to either a content provider or a content network/content aggregator) and MSOs 112. Specifically, the VOD management system 110 receives metadata 106 of various formats, and tracks multimedia asset data files 108 with which the metadata 106 is associated. A multimedia asset data file 108 may include content (such as, e.g., a feature file, a preview file, a graphics file, and the like; these may be referred to herein as "elements"), basic metadata associated with each element that provides information on the elements that helps confirm accuracy of delivery. The feature may be in any suitable format, such as, e.g., a MPEG file. Multimedia asset data files 108 for movies, for example, may include graphics files of movie poster art or box covers. These graphics files may be any suitable format, such as, e.g., JPEG, TIFF, GIF, and the like.

In a preferred embodiment, a web-based user interface 104 is provided for each content provider 102 to communicate with the VOD management system 110. The content provider 102 may transmit metadata to the VOD management system 110 using a variety of formats, including, but not limited to, CableLabs XML, MOD, tab delineated files, and the like. Using the interface 104, the content provider 102 preferably tracks the transmission of multimedia asset data files 108 and transmits related metadata 106 using a suitable internet protocol, such as, e.g., HyperText Transfer Protocol ("HTTP") or File Transfer Protocol ("FTP"). For example, the content provider 102 may use the interface 104 to provide the VOD management system 110 with the name of the multimedia asset data file 108, a description of the file 108, the MSOs 112 scheduled to receive the file 108, a target ship date for delivery of the file 108 to the specified MSOs 112, an actual ship date for delivery of the file 108 to the MSOs 112, and a delivery method for the file 108. The content provider 102 may also specify that different multimedia asset data files 108 form a single delivery group that contains several different features. The delivery group may, for example, contain several different movies and, accordingly, the multimedia asset data files 108 that are associated with those movies. As one example, the content provider 102 may create a delivery group entitled "July New Releases" and place within that delivery group the multimedia asset data files 108 associated with the new release movies scheduled to be released on that July. References herein to the transmission and delivery of multimedia asset data files 108 individually will also be understood to refer to the transmission and delivery of multimedia asset data files 108 in delivery groups.

Using the interface 104, the content provider 102 also specifies the calendar dates during which a particular multimedia asset data file 108 will be made available for delivery to MSOs 112 (and, therefore, for purchase by end users of the MSOs 112). The content provider 102 may also assign a delivery priority to each multimedia asset data file 108 (or delivery group of multimedia asset data files 108) in order to allow the VOD management system 110 to allocate bandwidth to various multimedia asset data files 108. The allocation of bandwidth is particularly important when multimedia asset data files 108 are being transmitted via satellite delivery. To facilitate the reception of multimedia asset data files 108 from content providers 102, the VOD management system 110 is configured to integrate with legacy/existing asset management systems, such as, e.g., digital asset management systems available from WebWare Corporation (Sausalito, Calif.). During the data entry process, information is validated for correctness and completeness.

As part of the title assembly workflow, multimedia asset data files 108 are registered with the VOD management system 110. Each content provider 102 is assigned a provider ID, and transmissions from the content provider 102 to the VOD management system 110 include the provider ID. Based upon the provider ID and a provider asset ID (i.e., an asset identifier provided by the content provider 102), the VOD management system 110 assigns a globally unique identifier to the corresponding multimedia asset data file 108 to identify the file 108 throughout the content delivery process.

As with the content providers 102, MSOs 112 preferably communicate with the VOD management system 110 using a web-based user interface 114. The VOD management system 110 coordinates the metadata 106 and multimedia asset data file 108 ingestion and validation process using a workflow customizable by the MSO 112. In general, the workflow requires that the metadata 106 and multimedia asset data file 108 comply with values and business rules provided by the MSO 112 before the VOD management system 110 will determine that the metadata 106 and multimedia asset data file 108 was properly received.

In one embodiment, the interface 114 enables a MSO 112 to enter, edit, and manage business rules using a text editor. In another embodiment, the interface 114 enables a MSO 112 to enter, edit, and manage business rules using a graphic user interface 114. Using the interface 114, a MSO 112 provides scheduling and business rules to the VOD management system 110, including, but not limited to, ratings filters, pricing rules, category rules, platform conversion rules, electronic program guide ("EPG") data, storage allocations for VOD servers, scheduling approval guidelines, and the like. The business rules are preferably contained within their own grouping elements, such as, e.g., ratings filters are grouped together and pricing rules are grouped together. The VOD management system 110 preferably stores business rules as XML documents, and identifies business rules with particular MSOs 112. Alternatively, the VOD management system 110 may store business rules in a database rather than as XML files. When the VOD management system 110 receives metadata 106 and multimedia asset data files 108 from a content provider 102, the VOD management system 110 validates the metadata 106 and files 108 using the business rules provided by the MSO 112. Descriptions of several exemplary business rules follow.

Ratings filters are rules used to block the delivery of files 108 based upon a rating, such as, e.g., a MPAA rating. A rating filter should consist of a rating and an associated action, such as "blocked" to specify that features with this rating should not be delivered or "unblocked" to specify that features with this rating may be delivered. For example, a particular deployment may use a ratings filter in order to prevent the delivery of adult content. The default behavior associated with a rating is "unblocked." That is, if a rating filter does not exist for a particular rating, the VOD management system 110 will consider features with that rating as "unblocked."

Figure 2:
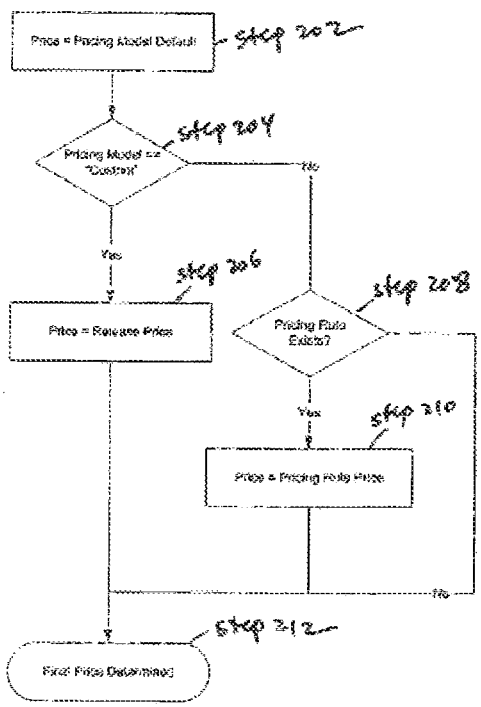
FIG. 2 illustrates a price calculation process using pricing rules as implemented by the systems and methods of the present invention.

Pricing rules allow a MSO 112 to determine and/or override a default price associated with a file 108. When used, pricing rules may allow a file 108 to receive a different price at each MSO deployment. FIG. 2 illustrates a price calculation process using pricing rules as implemented by the systems and methods of the present invention. During the creation of a multimedia asset data file 108, the content provider 102 assigns a default pricing model to the file 108. The pricing model will tag the file 108 for purposes of pricing and assign the file 108 a default price. The pricing model may be specific to a particular MSO 112, and may also include a name for the pricing model (e.g., "Kids," "New Release," "Library," "Adult," "Top Picks," "Custom," and the like), a string description of the pricing model, a default price associated with the pricing model, and a client ID or other identification to associate the pricing model with a particular MSO 112. In one embodiment, the assignment of the pricing model will be independent of the feature associated with the file's 108 genre and/or categorization. If needed, a MSO 112 or a content provider 102 will be able to assign a customized pricing model to the multimedia asset data file 108. Additionally, the VOD management system 110 can associate a pricing override with a pricing model. A pricing override will consist of a pricing model name and an associated price. A feature's price is first set using the default price associated with its assigned pricing model (step 202). The VOD management system 110 next analyzes the multimedia asset data file 108 to determine whether a custom pricing model has been assigned to the file 108 (step 204). In the case where the file 108 has been assigned to a custom pricing model, the feature's specially assigned price is used instead of the default price (step 206). If the file 108 has not been assigned a custom pricing model, the VOD management system 110 determines whether a pricing rule, such as a pricing override rule, has been assigned to the file 108 (step 208). If so, the VOD management system 110 assigns an override price to the file 108 (step 210). Upon completion of the aforementioned steps, the VOD management system 110 determines a final price for the file 108 (step 212).

Category rules allow a deployment's metadata file to receive only those categories that are locally defined. When used, category rules allow a file 108 to be categorized differently across a MSO 112 network.

Platform specialization or conversion rules allow the VOD management system 110 to structure an electronic program guide ("EPG") to a custom format that may be designated by each MSO 112 or MSO location (deployment). In one embodiment, a minimum of three sets of platform conversion rules are used to provide for three different displays available for a MSO's 112 EPG. The platform conversion rules are used by the VOD management system 110 to convert the presentation format of metadata associated with a feature into a display format that is specific to the needs of a particular MSO 112. The VOD management system 110 also utilizes the platform conversion rules to generate an appropriate platform compliant XML for a MSO 112, and may also use the conversion rules to handle image conversion for a particular MSO 112. In one embodiment, the platform conversion rules are hard coded. In another embodiment, the platform conversion rules utilize a script design that facilitates changes to any particular set of conversion rules.

The custom EPG function of the VOD management system 110 is also usable to generate targeted promotions. For example, the EPG for a MSO 112 may be customized with multimedia promotional elements including detailed information about available VOD features and reviews of the available VOD features.

In another embodiment, the VOD management system 110 is capable of customizing the EPG to allow functionality similar to an interface provided by a DVD feature. The DVD-like functionality that the VOD management system 110 adds to the EPG includes allowing an end user to choose alternate endings of a feature or different commentary tracks for a feature. Accordingly, the VOD management system 110 is capable of processing and distributing multimedia asset data files 108 that incorporate multiple language tracks, multiple video assets (e.g., alternate endings, deleted scenes, and the like), multiple graphics, and an extensible metadata scheme to include any additional text that may be desired for a given multimedia asset data file 108 to provide DVD-like features. When delivering these multimedia asset data files 108, the VOD management system 110 is capable of customizing a particular EPG to enable an end user to enable the DVD-like features included with the file 108.

The VOD management system 110 enables users to view and analyze metadata and scheduling information. For example, when multimedia asset data files 108 are scheduled to be delivered in delivery groups, the user interface 104 enables the content provider 102 to locate an existing/scheduled delivery group by searching for one of the following parameters: the name of a specific delivery group; delivery groups that contain a specific multimedia asset data file 108, e.g., delivery groups that contain a specific movie or other feature; delivery groups that are scheduled for a specific MSO 112; the status of delivery groups, e.g., in progress, approved, completed, and the like; or the scheduled target delivery date. The level of information available to any particular user will vary depending on that user's clearance level.

In another embodiment, the VOD management system 110 incorporates an advertising server that is capable of implementing dynamic advertising play lists that are targeted to individual end users. The advertising server is preferably in operable connection with the VOD server 125 of a MSO 112. The VOD management system 110 is configured to analyze the usage data provided by the VOD server 125 and generate usage reports in order to deliver information necessary for the advertising server to personalize advertising to an end user. For example, the VOD management system 110 analyzes the usage reports to build business rules that are used to deliver data used and analyzed by the advertising server to insert ads into content delivered to an end user. The advertising delivered to a particular end user is preferably determined based upon the end user's viewing habits and characteristics. For example, the VOD management system 110 may generate an advertising play list that includes advertising relating to sports or action movies that may be inserted into content to be delivered to an end user whose viewing characteristics include a number of action movies. The play list is then delivered to the advertising server, and the advertising server analyzes advertising inventory to create a suitable matching ad that is, in turn, inserted into a feature ordered by the end user and delivered by the VOD server 125. In another embodiment, the advertising play list generated by the VOD management system 110 includes advertising that is manually inserted by either the MSO 112 or a content provider 102 to provide an on-demand advertising function that enables the specific targeting of advertising to certain end users.

In another embodiment, the VOD management system 110 enables campaign management functionality designed to make possible for a content provider 102 or MSO 112 to control the marketing and branding of its content. Features provided by the campaign management functionality include enabling a content provider 102 or MSO 112 to bundle selected groups of multimedia asset data files 108, set pricing for multimedia asset data files 108, determine promotions for multimedia asset data files 108, and provide closed-loop reporting. For example, a content provider 102 or MSO 112 may analyze a usage report provided by the VOD management system 110 to select certain multimedia data asset files 108 based upon, e.g., end user viewing habits, and then use the campaign management functionality to bundle selected multimedia asset data files 108, set pricing for selected files 108, and set promotions for selected files 108. An additional feature that may be provided by the campaign management functionality is to increase a content provider's 102 (and MSO's 112) visibility into the content preparation and distribution process while abstracting away details such as formats, bit rates, and regional business rules. Also, the campaign management functionality may be configured to allow a content provider 102 to implement advertising supported VOD. In another embodiment, the VOD management system 110 is configured to integrate with third party campaign management tools.

Figure 3:
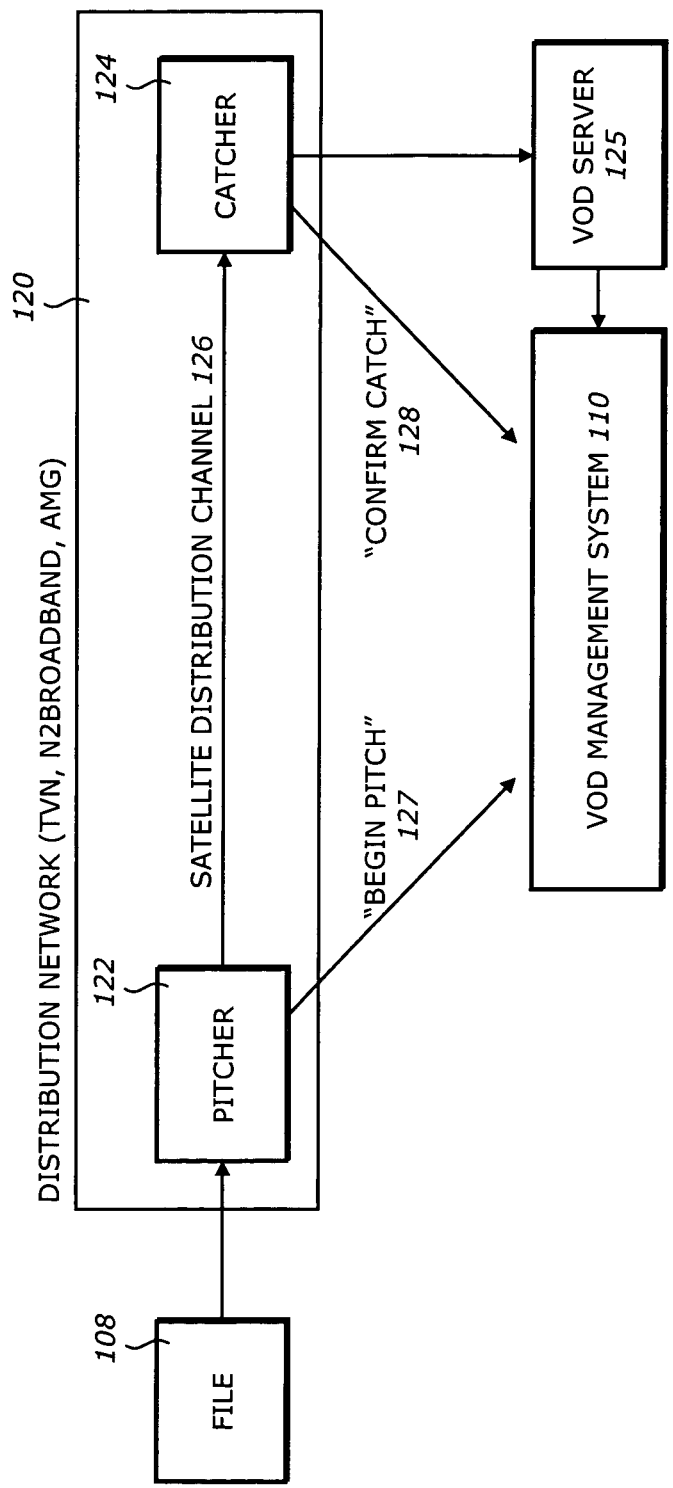
FIG. 3 is a schematic diagram of an asset distribution functional component of a VOD management system of the present invention.

Using the methods of the present invention, the multimedia asset data files 108 are distributed to MSOs 112. Turning to FIG. 3, the components of a system required to implement the asset distribution functional component are illustrated. A multimedia asset distribution system or network ("ADS") 120 facilitates the delivery of multimedia asset data files 108 from content providers 102 to the MSO 112. Each content provider 102 uses a pitcher appliance 122 to transmit multimedia asset data files 108 to the MSO 112. The multimedia asset data files 108 may be scheduled for individual transmission to the MSO 112, or a group of multimedia asset data files 108 may be scheduled for transmission as part of a delivery group to the MSO 112. Although only one pitcher 122 is illustrated, it will be appreciated that each content provider 102 may implement a plurality of pitchers 122.

The pitcher 122 is a hardware and software component that is responsible for initiating and coordinating the transfer of a multimedia asset data file 108 to the MSO 112. The pitcher 122 may be implemented using any suitable server, such as, e.g., servers available form Compaq/Hewlett-Packard (Palo Alto, Calif.). In one embodiment, the pitcher 122 will deconstruct a multimedia asset data file 108 into smaller elements in order to expedite the transfer of the multimedia asset data file 108 to the MSO 112. In a preferred embodiment, the pitcher 122 also augments the multimedia asset data file 108, and elements (e.g., feature, preview, and graphics files for multimedia asset data files 108 relating to the feature) thereof, with metadata 106. The pitcher 122 transmits the elements of the multimedia asset data file 108, along with associated metadata 106, to a catcher appliance 124 using any suitable satellite distribution channel 126. The satellite distribution channel 126 may include, for example, an Internet Protocol ("IP") encapsulator that is coupled to both the pitcher 122 and a satellite uplink facility. Here, the IP encapsulator is configured to relay transmissions from the pitcher 122 to the satellite uplink facility. The satellite uplink facility then transmits the data elements of the multimedia asset data file 108 to various orbiting satellites, which in turn transmit the elements to a satellite downlink facility of the MSO 112.

The MSO 112 implements catcher appliances 124 coupled to its satellite downlink facility and configured to receive transmissions originating from content providers 102. To process multiple data transmissions from multiple content providers 102, the MSO 112 may utilize a farm containing a plurality of catchers 124, or use multiport catchers 124 configured to simultaneous receive a plurality of transmissions from multiple content providers 102. An example multiport catcher suitable for use with the present invention is disclosed in co-pending and commonly assigned application entitled "Multicast Distribution System" filed on Oct. 22, 2003, U.S. application Ser. No. 10/692,082, which is incorporated herein by reference.

Each catcher 124 is a hardware and software component that may be based on servers such as those available from Compaq/Hewlett-Packard (Palo Alto, Calif.), Dell Computer (Round Rock, Tex.), and IBM (Armonk, N.Y.). In a preferred embodiment, the catcher 124 will include a minimum of 256 MB of random access memory ("RAM"), a plurality of peripheral component interconnect ("PCI") expansion slots to support the integration of a data receiver card (with a multiport catcher 124 having as many PCI slots as the desired number of data receiver cards within the catcher 124), and at least one data receiver card capable of receiving satellite transmissions. Multiport catchers 124 will implement a plurality of data receiver cards. In one embodiment, universal serial bus ("USB") ports are provided on the catcher 124 and allow for the addition of functionality via external peripherals. Additionally, the catcher 124 includes at least 120 GB of storage capacity. For robustness and reliability, the storage may be allocated across a redundant array of inexpensive disks ("RAID") array, and to minimize cost IDE storage technology may be utilized. Furthermore, the catcher 124 may incorporate a form of out-of-band management that would allow for dial-up access, cold start-up, or manual rebooting of the catcher 124 if necessary.

In addition to satellite transmissions, the catcher 124 is preferably also able to receive multimedia asset data files 108 locally using physical media (i.e., tapes or disks), a local network, or a terrestrial-based network. Accordingly, the catcher 124 may incorporate a digital versatile disc ("DVD") based drive or other suitable local data drive. Similarly, the catcher 124 may be coupled to a FTP server to obtain multimedia assets from the FTP server. The catcher 124 may further include a removable disk drive to allow for local exchange of data via removable disks.

The catcher 124 is configured to confirm successful receipt of transmissions originating from a pitcher 122. Accordingly, the catcher 124 is operably coupled to the VOD management system 110 via a network connection 128. The network connection 128 may be any suitable communications network, such as, e.g., an internet-based network, a public switched telephone network ("PSTN"), a corporate virtual private network ("VPN") and the like. To connect to the network connection 128, the catcher 124 preferably incorporates a network interface ("NIC") card that enables the catcher 124 to utilize 10/100 ethernet, or a similar high speed network connection. Alternatively, the catcher 124 may use a standard modem to connect to the network connection 128. Using the network connection 128, the catcher 124 acknowledges to the VOD management system 110 a successful or failed transmission, and in the event of a failed transmission, requests a complete or partial retransmission of the multimedia asset data file that was not properly received. In a similar fashion, a network connection 127 between each pitcher 122 and the VOD management system 110 is provided. The pitcher 122 utilizes the network connection 127 to inform the VOD management system 110 when a transmission is initiated by the pitcher 122.

Copending and commonly assigned application entitled "Multicast Distribution System" filed on Oct. 22, 2003, U.S. application Ser. No. 10/692,082, which is incorporated herein by reference, discloses additional details of an asset distribution system suitable for use with the systems and methods of the present invention, and has been expressly incorporated by reference.

Figure 4:
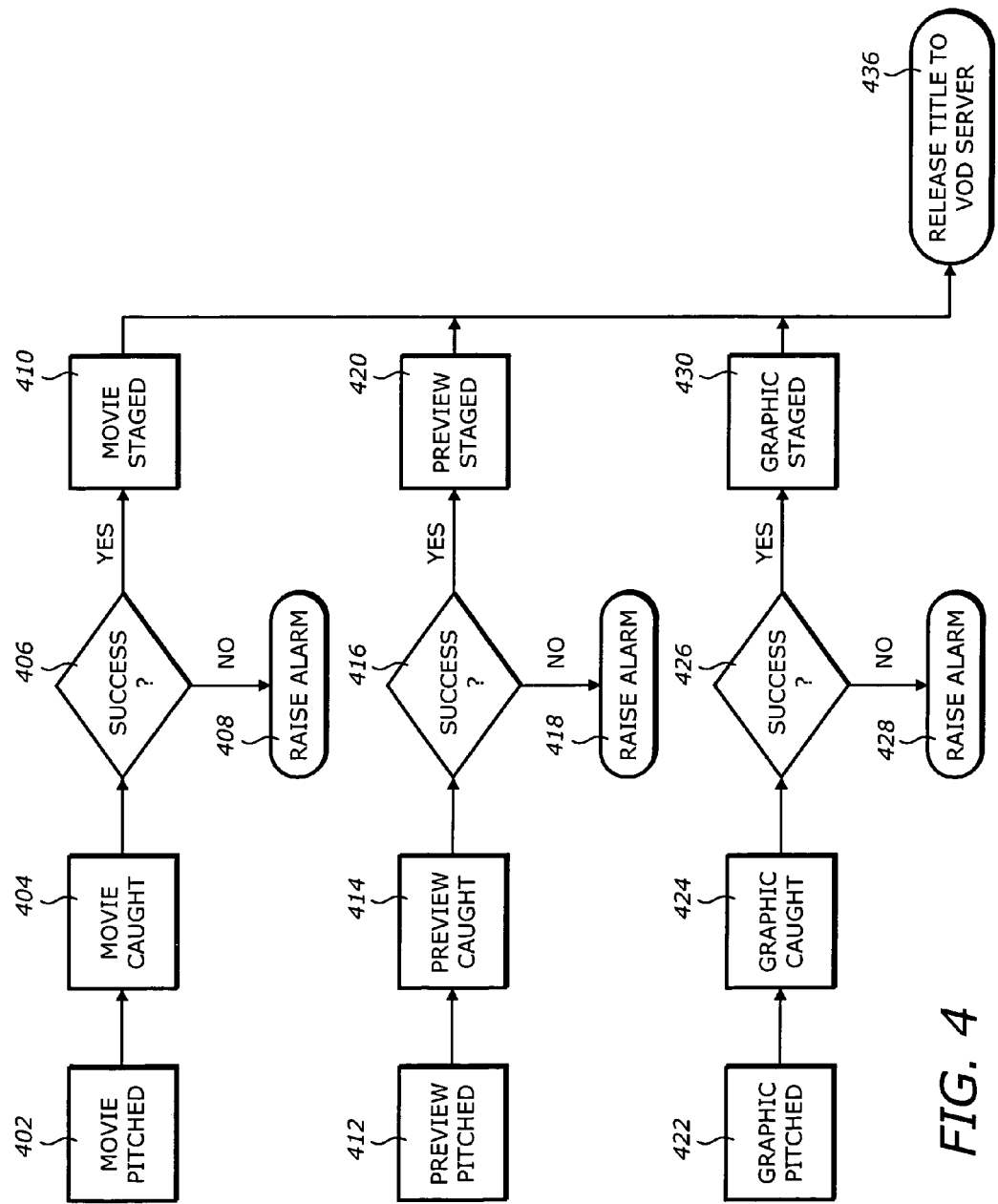
FIG. 4 illustrates a workflow implemented by an asset distribution functional component of a VOD management system of the present invention.

FIG. 4 illustrates an example workflow that is implemented by the asset distribution functional component of the present invention. As noted herein, the pitcher 122 of a content provider 102 transmits a multimedia asset data file 108 to the catcher 124 in elements. FIG. 4 shows the distribution of a multimedia asset data file 108 using three elements, namely a feature element with related basic metadata, a preview element with related basic metadata, and a graphic element with related basic metadata. The pitcher 122 transmits the movie/feature element (step 402), and the movie/feature element is subsequently received by the catcher 124 of the MSO 112 (step 404). The catcher 124 analyzes the movie/feature element and related metadata to determine whether the element was properly received (step 406). If the movie/feature element was not properly received, the catcher 124 transmits an alarm to the VOD management system 110 to inform the VOD management system 110 that a retransmission of the movie/feature element is required (step 408). If the movie/feature element was properly received, the catcher 124 stages the movie/feature element while awaiting delivery of the other elements of the multimedia asset data file 108 (step 410). Next, the pitcher 122 transmits the preview element (step 412), and the preview element is subsequently received by the catcher 124 (step 414). The catcher 124 analyzes the preview element and related metadata to determine whether the element was properly received (step 416). The catcher 124 transmits an alarm to the VOD management system 110 if the preview element was not properly received, thereby informing the VOD management system 110 that a retransmission of the preview element is necessary (step 418). If the preview element was properly received, the catcher 124 stages the preview element while awaiting delivery of the other elements of the multimedia asset data file 108 (step 420). Finally, the pitcher 122 transmits the graphic element (step 422), which is received by the catcher 124 (step 424). The catcher 124 analyzes the graphic element and related metadata to determine whether the element was properly received (step 426). If the graphic element was not properly received, the catcher 124 transmits an alarm to the VOD management system 110, informing the VOD management system 110 that a retransmission of the graphic element is required (step 428). If properly received, the catcher 124 stages the graphic element along with the other already received elements of the multimedia asset data file 108 (step 430). It will be appreciated that a greater or smaller number of elements may be used, and that the elements may be transmitted in any order.

After receiving all of the elements of the multimedia asset data file 108, the catcher 124 confirms successful delivery of the multimedia asset data file 108 to the VOD management system 110 and waits for a request from the VOD server 125 to release the multimedia asset data file 108 to the VOD server 125. Using the master schedule generated by the VOD management system 110, the catcher 124 then releases the file 108 to the VOD server 125 (step 436). The VOD management system 110 tracks the request and delivery of metadata 106 and the file 108 to the VOD server 125.

The methods of the present invention are also used to coordinate the upload of content from several content providers, as well as provide visibility into the success or failure of the upload process. The process of uploading content to a VOD server 125 is driven by the VOD server 125 and coordinated by the VOD management system 110. Working with the VOD management system 110 and the catcher or catchers 124, the VOD server 125 coordinates the upload of the multimedia asset data files 108 that are received from the content providers 102, and also provides visibility into the success or failure of the upload process. The process of distributing a multimedia asset data file 108 starts with the file 108 being assigned to a distribution schedule. Scheduling involves selecting distribution dates (including a start and an end date), selecting the appropriate set of VOD deployments (i.e., head ends), and assigning marketing information such as, e.g., pricing and categorization. In addition, scheduling may also involve the selection of the multimedia asset data files 108 that should be distributed to end users. Prior to the distribution of a multimedia asset data file 108 to a particular end user, the scheduling information for the file 108 must be approved by the VOD management system 110.

Figure 5:
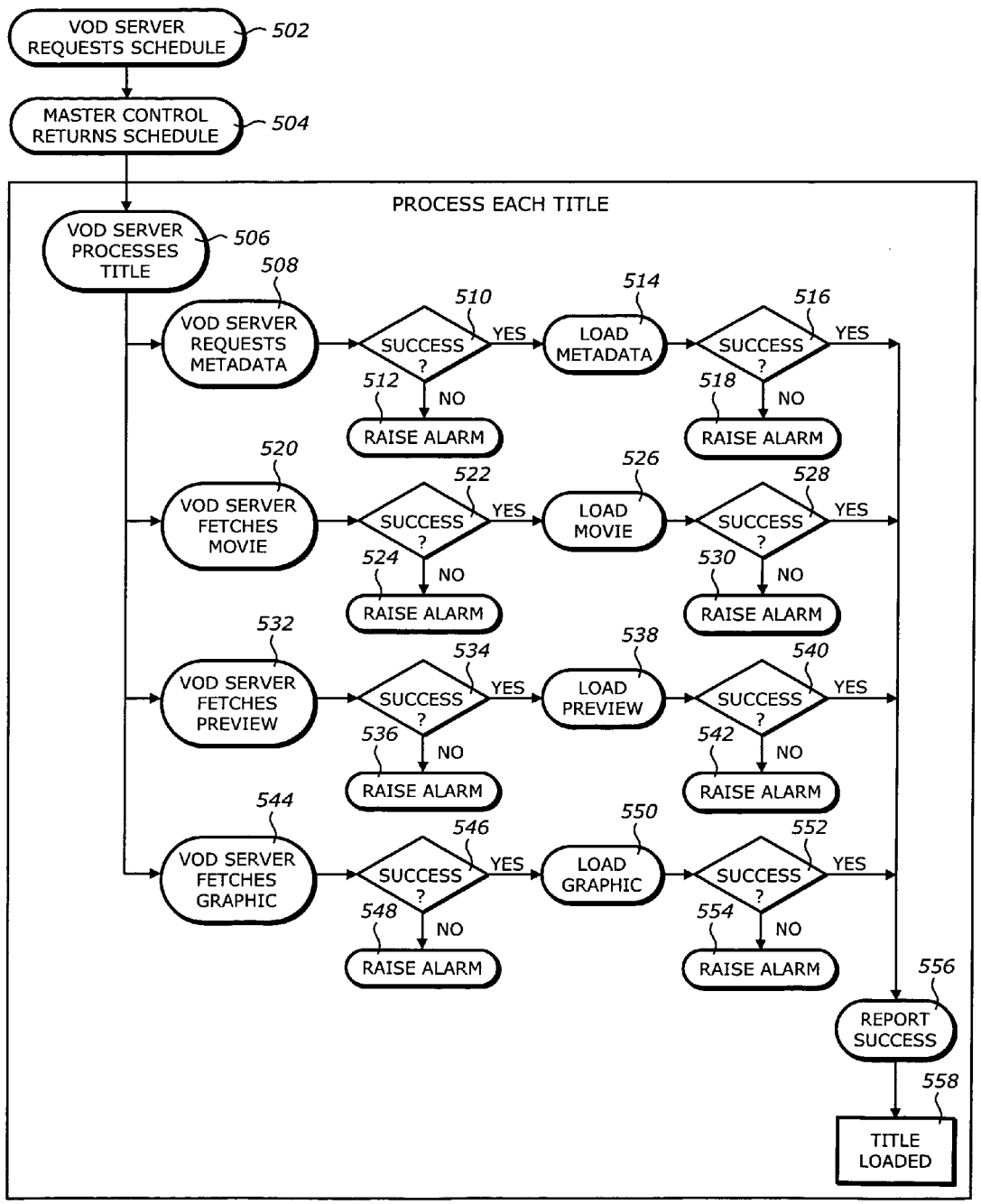
FIG. 5 illustrates a workflow implemented by a content upload functional component of a VOD management system of the present invention.

Turning to FIG. 5, an example workflow implemented by the content upload functional component of the system is illustrated. The VOD upload coordination process is initiated by distributing a localized master schedule to each MSO 112. As shown in FIG. 5, the VOD server 125 submits a schedule request to the VOD management system 110 of the system (step 502). In this example, the VOD server 125 may initiate a schedule update request to the VOD management system 110 at a regular interval, such as, e.g., daily, hourly, and the like. In response, the VOD management system 110 provides a customized or localized master schedule for the MSO 112 to the MSO's VOD server 125 (step 504). In one embodiment, a file 108 will be included as part of the master schedule once all of the following steps have been completed: the file 108 has been successfully received by the catcher 124, the content provider 102 and MSO 112 have inserted all associated metadata 106 into the VOD management system 110, the content provider 102 or MSO 112 has provided a date on which the file 108 and metadata 106 should be uploaded to the VOD server 125 and that date or the business rules governing that date have been determined to be met by the VOD management system 110, and the MSO 112 has indicated the priority of the file 108 relative to other files. The master schedule is customized for each MSO 112 and reflects the status of the multimedia asset data files 108 that are to be delivered to each MSO 112 or MSO location (deployment). The VOD server 125 then processes the schedule update it receives from the VOD management system 110 by modifying the localized master schedule. For example, the schedule update includes instructions for inserting and deleting files 108 from the master schedule and performing other updates to the master schedule. Similarly, the VOD server 125 may initiate and process metadata updates to change the title, pricing, category, description, and the like, of a multimedia asset data file 108. The schedule allows the VOD server 125 to locate the elements of a multimedia asset data file 108 by providing locator URLS. The locator URLs may include a metadata URL that points to a location on the VOD management system 110 and an asset URL that points to a local FTP server or catcher 124, for example. Because the schedule is configurable for each MSO 112 and each deployment, the present invention is capable of coordinating the prioritization and scheduling of the delivery of multimedia asset data files 108 to each individual MSO 112 or each individual MSO 112 deployment. Furthermore, the customized schedules are usable with the previously discussed custom EPG function to further customize the EPGs used by each MSO 112 or deployment.

Multimedia asset data files 108 may be stored by the VOD management system 110 in either internal content locations (e.g., multimedia asset management ("MAM") systems that include large third party deep archive repositories) or external content locations (e.g., catchers 124 maintained by MSOs 112). That is, the files 108 themselves can be physically located in any storage device or location, as long as the VOD management system 110 is able to track that location, such as, e.g., tracking the physical location of the file by reference to an asset locator URL (or asset URL) for that physical location. The following discussion focuses on files 108 stored at external content locations, e.g., at catchers 124 maintained by MSOs 112. Here, to upload and process a multimedia asset data file 108, the VOD server 125 must retrieve the various elements of the multimedia asset data file 108 from a catcher 124 (step 506). The master schedule allows the VOD server 125 to locate the elements of the multimedia asset data files 108 (ex. feature, preview, graphic, metadata) that have been transmitted to the catcher 124 by providing metadata URLs for each multimedia asset data file 108. The URL used to retrieve the elements of the multimedia asset data file 108 will vary depending on the caller location, access protocol, and security. The specific machine that is accessed to obtain an element will depend on a caller location. The specific machine accessed by the VOD server 125 will generally be the catcher 124, but may be an archive repository for internal content. The URL further indicates the appropriate protocol used to retrieve a element from a particular machine (e.g., file://, http://, ftp://, https://, and the like). Also, the URL provides a user or caller with information necessary to authenticate with a content host.

The VOD server 125 submits the metadata URL, which may contain a server ID and an asset ID, for a particular multimedia asset data file 108 to the VOD management system 110, and the VOD management system 110 in turn provides asset URLs, with data regarding the physical location of files, to the VOD server 125 (step 508). In one embodiment, the VOD management system 110 may generate responsive metadata on-the-fly, thereby allowing for metadata localization and permitting vendor-specific adjustments. After receiving the asset URLs from the VOD management system 110, the VOD server 125 analyzes the asset URLs to determine whether the data was properly received (step 510). If the VOD server 125 determines that the asset URLs were not properly received, the VOD server 125 transmits an alarm to the VOD management system 110 to request a retransmission of the asset URLs (step 512). If the asset URLs are properly received, the VOD server 125 then loads the metadata (step 514). The VOD server 125 determines whether the metadata was properly loaded (step 516), and in the event of a failure to properly load the metadata the VOD server 125 transmits an alarm signal to the VOD management system 110 (step 518), thereby informing the system that follow-up and diagnosis is required.

The asset URLs are used by the VOD server 125 to retrieve the elements of the multimedia asset data file 108 that have been transmitted to the catcher 124. In the illustrated example in which movie/feature, preview, and graphics elements were transmitted to the catcher 124, using the asset URLs received from the VOD management system 110, the VOD server 125 initiates a series of file transfers, which may be FTP transfers for example, from the catcher 124 in order to load the elements of the multimedia asset data file 108.

For the movie/feature element, the VOD server 125 submits the asset URL corresponding to the movie/feature element to the catcher 124, and the catcher 124 responds by transmitting the movie/feature element to the VOD server 125 (step 520). After receiving the movie/feature element from the catcher 124, the VOD server 125 analyzes the movie/feature element to verify that the element was properly received (step 522). If the movie/feature element was not properly received, the VOD server 125 transmits an alarm to the VOD management system 110 and/or the catcher 124 (step 524). If the movie/feature element is properly received, the VOD server 125 begins to load the element (step 526). The VOD server 125 determines whether the movie/feature element was properly loaded (step 528). In the event of a failure to properly load the movie/feature element, the VOD server 125 transmits an alarm signal to the VOD management system 110 (step 530), thereby informing the system 110 that follow-up and diagnosis is required.

The VOD server 125 retrieves the preview element of the multimedia asset data file 108 in a similar manner. For example, the VOD server 125 submits the asset URL corresponding to the preview element to the catcher 124, and in response the catcher 124 transmits the preview element back to the VOD server 125 (step 532). After receiving the preview element from the catcher 124, the VOD server 125 analyzes the element to determine whether the preview element was properly received (step 534). If the preview element was not properly received, the VOD server 125 transmits an alarm to the VOD management system 110 (step 536). Otherwise, the VOD server 125 begins to load the preview element (step 538). The VOD server 125 determines whether the preview element was properly loaded (step 540). In the event of a failure to properly load the preview element, the VOD server 125 transmits an alarm signal to the VOD management system 110 (step 542), thereby informing the system 110 that follow-up and diagnosis is required.

In the example workflow, the VOD server 125 also retrieves a graphic element of the multimedia asset data file 108. As with the movie/feature and preview elements, the VOD server 125 submits the asset URL corresponding to the graphic element to the catcher 124, and in response the catcher 124 transmits the graphic element back to the VOD server 125 (step 544). After receiving the graphic element from the catcher 124, the VOD server 125 determines whether the element was properly received (step 546). If the graphic element was not properly received, the VOD server 125 transmits an alarm to the VOD management system 110 (step 548). If the graphic element was properly received, the VOD server 125 begins to load the element (step 550). Next, the VOD server 125 determines whether the graphic element was properly loaded (step 552). In the event of a failure to properly load the graphic element, the VOD server 125 transmits an alarm signal to the VOD management system 110 (step 554), thereby informing the system 110 that follow-up and diagnosis is required.

The upload process terminates when the VOD server 125 confirms the success or failure of a particular attempt to load all of the elements of the multimedia asset data file 108 (step 556), and the file 108 is completely loaded on the VOD server 125 (step 558). In order to improve visibility of the upload process, additional status updates may occur earlier in the upload process, for example, upon completion of the FTP transfer of one of the elements of the multimedia asset data file 108. Additionally, the VOD server 125 preferably continuously updates the status of the multimedia asset data file 108 with the VOD management system 110 throughout the upload process.

By verifying the proper reception and loading of the elements of the multimedia asset data file 108 throughout the upload process (ex. steps 510, 516, 522, 528, 534, 540, 546, 552), the system 110 provides real-time or near real-time verification of content delivery failures, as well as visibility into the VOD server 125 upload operations as they pertain to the content delivery process.

The methods of the present invention are also used to aggregate usage information from each VOD deployment, and thereby provide visibility into the use of the multimedia asset data files 108. At regular intervals, the VOD server 125 provides the VOD management system 110 with data on the features that are requested by the users of the MSO 112. Using this data, the VOD management system 110 prepares a usage report. To prepare the usage report, the VOD management system 110 creates a master reporting database that includes usage information from across the MSO's 112 network. In one embodiment, the usage report is provided to the MSO 112 and the content providers 102 in the form of stock reports. Preferably, the MSO 112 has access to the entirety of the usage report, whereas the content providers 102 have restricted access to the usage report. Here, the MSO 112 provides the VOD management system 110 with business rules to determine the extent to which any content provider 102 has access to the usage report. Additionally, the VOD management system 110 is capable of exporting the usage report, or the underlying data, to other systems in order enable the MSO 112 to conduct a more advanced analysis of the usage patterns of the features delivered by the VOD servers 125 to its users. The information and data contained in the usage report may include a listing of the multimedia content that has been licensed, the content that is available for distribution to the users, the estimated time a particular multimedia asset data file 108 will be delivered to the MSO 112, the time at which a multimedia asset data file 108 was loaded on to a VOD server 125 of the MSO 112, the amount of storage on the VOD servers 125 that is allocated to any particular content provider 102, the revenue generated by any specific feature, and the like. Usage reports are capable of being searched and sorted using multiple criteria, including, e.g., content provider, studio, genre, region, and the like. Furthermore, in one embodiment, the VOD management system 110 incorporates preference engines that aid content providers 102 and MSOs 112 target promotions and advertisings to certain users based upon the usage report. Additionally, the VOD management system 110 is capable of supplementing the metadata of each multimedia asset data file 108 with data contained in the usage reports. For example, the metadata of a given multimedia asset data file 108 may be supplemented/augmented with detailed performance/usage information for that multimedia asset data file 108 that a content provider 102 or MSO 112 may later user for campaign management. For example, after analyzing the usage information for a multimedia asset data file 108, a content provider 102 may elect to bundle that file 108 with other files 108, initiate promotional pricing for that file 108, and the like.

To facilitate communication between the VOD management system 110 and applications used by the MSOs 112 and content providers 102, the VOD management system 110 will preferably implement a light weight web services API. The VOD management system 110 web service API is preferably implemented via XML over HTTP/HTTPS with requests initiated via HTTP "GET" and "POST" commands. Requests sent to the web services API may be initiated via a HTTP query string, with the web services API returning responses as XML documents. API query strings preferably consist of a protocol (HTTP or HTTPS), a VOD management system 110 host and port, a root path (/mms/), a method name, and a query string. Access to the VOD management system 110 web service API is handled via HTTP basic authentication. Remote applications preferably access the VOD management system 110 as a specific user. The VOD management system 110 will respond to the API call or refuse the connection depending on the VOD management system 110 roles (level of authorization) associated with the user/remote application.

Preferably, the web services API will be capable of performing the following functions. The web services API will allow for an asset initialization call that enables a content provider 102 to register a multimedia asset data file 108 with the VOD management system 110. A pitcher confirmation call may be used by a pitcher 122 to signal to the VOD management system 110 that a multimedia asset data file 108 has been successfully pitched. A catcher confirmation call may be used by a catcher 124 to signal to the VOD management system 110 that a multimedia asset data file 108 has been successfully caught. Additionally, in the event of a catch or validation failure, the catcher 124 may use the catcher confirmation call to transmit an error message to the VOD management system 110. A schedule request call may be used by the VOD server 125 to request a schedule from the VOD management system 110. A metadata request call may be used by the VOD server 125 to request localized package metadata from the VOD management system 110. A package confirmation call may be used by the VOD server 125 during the upload process in order to communicate, to the VOD management system 110, status changes associated with the multimedia asset data file 108 during the upload. The VOD server 125 may also use a reporting call to deliver usage reporting statistics, to the VOD management system 110, relating to the delivery of multimedia asset data files 108 to end users of the MSO 112. In a preferred embodiment, the web services API returns an XML document in response to any of the aforementioned calls, if a response is necessary. The response may also include standard HTTP status or error codes.

Figure 6:
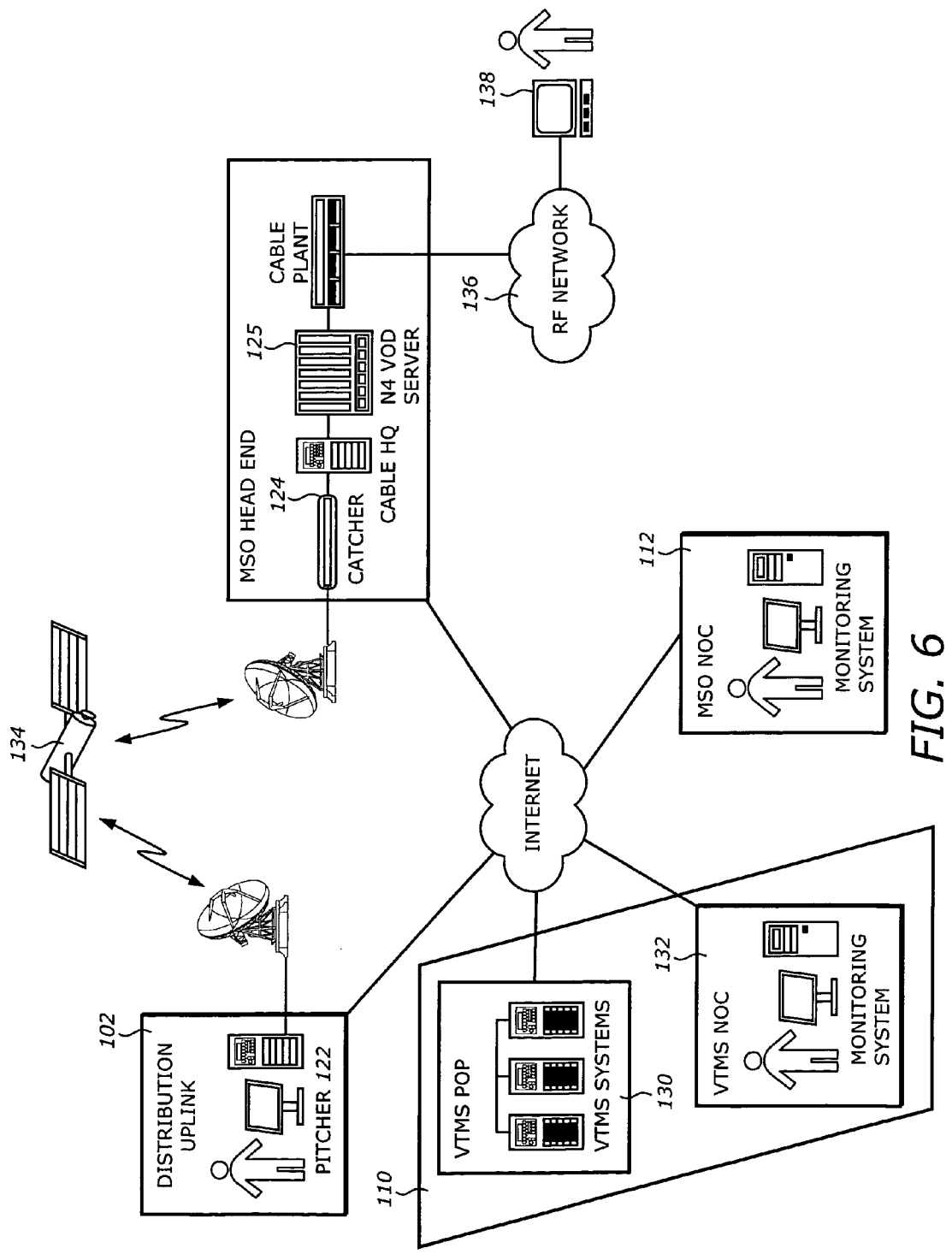
FIG. 6 is another illustration of physical components used to implement a VOD management system of the present invention.

Turning to FIG. 6, the physical components required to implement the systems and methods of the present invention are illustrated. The VOD management system 110 preferably includes a VOD management point of presence ("POP") 130 and a VOD management network operations center ("NOC") 132. The VOD management POP 130 is preferably a high availability data center with redundant power and cooling systems. The supporting infrastructure for the VOD management POP 130 will also include redundant application and database servers, server backup systems, high availability switching gear, and a dedicated firewall. The VOD management NOC 132 is utilized to monitor the VOD management system 110. The infrastructure to support and implement the VOD management NOC 132 is housed in a location in close proximity to (or in the same location as) the VOD management POP 130. To monitor the VOD management POP 130, the VOD management NOC 132 may use a simple network management protocol ("SNMP") management system. The MSO 112 has access to the VOD management system 110, preferably using an internet connection, in order to monitor the status of content being delivered to the catchers 124 of the MSO 112. The content providers 102 also preferably communicate with the VOD management system 110 via an internet connection. Additionally, the content providers 102 preferably utilize a satellite-based system 134 to deliver multimedia asset data files 108 to MSOs 112.

Each MSO 112 preferably implements a catcher 124 to receive multimedia asset data files 108. The catcher 124 then uploads the files 108 to a VOD server 125 as described herein.

Using a suitable network, such as, e.g., a RF network 136, the VOD server 125 then delivers the feature element or preview element obtained from the catcher 124 to end users, upon request by the end users, by delivering those elements to set top boxes 138.

Figure 7:
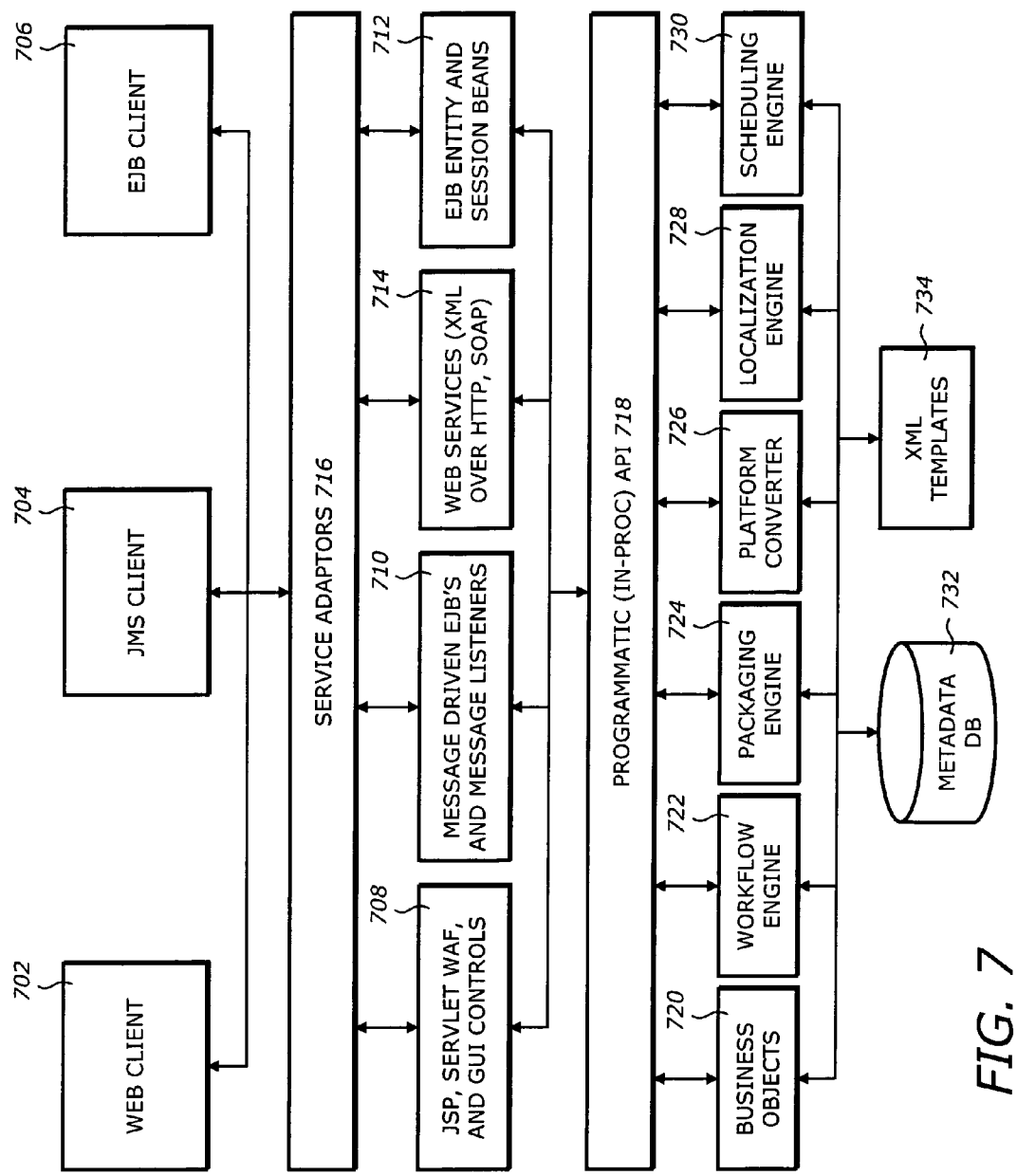
FIG. 7 illustrates the implementation layers of one embodiment of a VOD management system of the present invention.

FIG. 7 illustrates the implementation layers of one embodiment of the VOD management system 110. The top level of boxes in FIG. 7 are example application clients with which the VOD management system 110 may communicate. A web client 702 enables a user to communicate with the VOD management system 110 with a standard internet/web browser. A java message service ("JMS") client 704 enables a user to communicate with the VOD management system 110 using a JMS API. The JMS client 704 preferably utilizes established messaging formats, queues, and topics to initiate asynchronous calls between the client 704 and the VOD management system 110. An enterprise java beans ("EJB") client 706 utilizes J2EE enterprise java beans to initiate synchronous calls with the VOD management system 110. The EJB client 706 preferably utilizes established EJB home interfaces to construct objects, and uses session and entity bean interfaces to conduct synchronous calls.

The VOD management system 110 incorporates several external interfaces to facilitate communication between the application clients and the VOD management system 110. The following are several external interfaces suitable for incorporation into the VOD management system 110. A web foundations interface 708 generates the user experience and state needed to support a web client 702. The web foundation interface 708 may include java server pages ("JSPs"), servlets, wireless application framework ("WAF") components, and GUI beans. The web foundation interface 708 is preferably hosted by a J2EE application server's web container. A JMS API 710 is designed to receive and process JMS messages from a JMS client 704 and from remote messaging clients. The JMS API 710 is implemented using EJB message driven beans. The JMS API 710 is preferably also implemented as wrappers around lower-level application engines. An EJB API 712 provides EJB wrappers around low-level application functionality. The EJB API 712 provides a simple API that may be shared with developers, and may be implemented as stateless session EJBs. A web services API 714 provides a light weight synchronous API for interacting with the VOD management system 110, and is configured to interface with a web client 702. The web services API 714 preferably utilizes XML over HTTP or simple object access protocol ("SOAP") to access high level application functionality. In one implementation, the clients 702, 704, and 706 interact directly with the aforementioned external interfaces. Alternatively, the clients 702, 704, and 706 interact with the external interfaces using a set of helpers called service adaptors 716. Service adaptors 716 simplify communication with the clients 702, 704, and 706 by encapsulating any complexity associated with web, JMS, and EJB services, respectively.

The next layers of FIG. 7 represent internal system components of the VOD management system 110. These components are capable of running within a single process, although multiple instances may exist simultaneously within different processes. These components provide application interfaces for the internal operations and database schemes employed by the VOD management system 110. A component programmatic API 718 incorporates a set of java interfaces that address the VOD management system's 110 major functional components. The functions addressed by the component programmatic API 718 include managing workflow, maintaining database persistence, managing packaging of multimedia asset data files 108, localization of those files 108, and scheduling of the deployment of the files 108. A set of engine implementations incorporate the bulk of the VOD management system's 110 programming code, and implements interfaces used by the system 110. The engine implementations include a business objects engine 720, a workflow engine 722, a packaging engine 724, a platform converter engine 726, a localization engine 728, and a scheduling engine 730. These engines provide flexible and extensible functionality that may be customized to address the needs of specific MSOs 112 and content providers 102.

The VOD management system 110 also makes use of both a metadata relational database 732 to store data. Information is preferably stored in the form of XML documents based on XML templates 734.

The methods and systems of the present invention, although described with respect to VOD content delivery to MSOs 112, are also usable in other environments. For example, the methods and systems of the present invention may be used by a telephone company or a content delivery network. Because the methods and systems of the present invention are designed to support a continuum of platform delivery options, the methods and systems of the present invention may be used to support broadband delivery, interactive television content delivery, streaming content, cable video-on-demand, cable subscription video-on-demand, head end origination, and downloading of content.

With specific regard to the delivery of broadband content and the use of PC-centric headends by MSOs 112, the methods and systems of the present invention provide a mechanism for pre-caching broadband content by coordinating the delivery and propagation of assets regardless of origin or destination. Broadband content that may be pre-cached by the present invention include IP video, non-video IP, web or internet content, and interactive television content and related applications.

Though the invention has been described with respect to specific preferred embodiments, many variations and modifications will become apparent to those skilled in the art. It is therefore the intention and expectation that the appended claims be interpreted as broadly as possible in view of the prior art in order to include all such variations and modifications.

What is claimed is:

1. A method performed by a processor-based device, the method comprising:
receiving, by a video-on-demand ("VOD") management system, metadata associated with a multimedia asset data file provided by at least a content provider, the multimedia asset data file having a content element with which the metadata is associated and being delivered to end users upon requested, the metadata comprises information on at least accuracy of delivery of the multimedia asset data file as determined by a catcher appliance receiving the multimedia asset data file from a pitcher appliance, wherein the metadata further comprises a default pricing associated with the multimedia asset data file;
validating, by the VOD management system, the multimedia asset data file and the associated metadata by determining if the multimedia asset data file and the associated metadata comply with business rules provided by a multiple service or systems operator ("MSO"), wherein the business rules comprise pricing rules;
determining, by the VOD management system, whether a customized pricing has been assigned to the multimedia asset data file by the MSO,
wherein in response to the determining that the customized pricing has been assigned to the multimedia asset data file by the MSO, the assigned customized pricing is used instead of the default pricing, and
in response to the determining that the customized pricing has not been assigned to the multimedia asset data file, the default pricing is used if an override price has not been assigned;
coordinating delivering the multimedia asset data file and associated metadata to a VOD server maintained by the MSO, wherein coordinating delivering comprises:
tracking distributing the multimedia asset data file from the content provider to the MSO, and
tracking uploading the multimedia asset data file from the MSO to the VOD server; and
providing usage reports relating to usage of multimedia asset data files by end users of the MSO.

2. The method of claim 1, wherein the metadata are provided by at least one of a plurality of content providers and a plurality of MSOs.

3. The method of claim 1, wherein tracking distributing comprises:
tracking receipt of the multimedia asset data file in elements, the elements comprising at least one of a feature file, a preview file, a graphic file, and associated basic metadata, wherein the associated basic metadata comprises information on the elements used to confirm delivery of the elements;
receiving an identification of the MSO scheduled to receive the multimedia asset data file from the content provider; and
receiving delivery dates for delivery of the multimedia asset data file to the MSO.

4. The method of claim 3, wherein tracking receipt comprises:
staging the multimedia asset data file by entering a name for the multimedia asset data file into a staging directory; and
providing a master markup language file for the multimedia asset data file, the master markup language file comprising distribution information, scheduling information, content information, and an identification for the multimedia asset data file, wherein the content information comprises data to enable retrieval of a plurality of elements to assemble the multimedia asset data file.

5. The method of claim 4, wherein the elements used to assemble the multimedia asset data file comprise at least one of a movie or feature file, a preview file, and a graphic file.

6. The method of claim 1, wherein tracking distributing comprises tracking distributing using a delivery group, the delivery group comprising a plurality of multimedia asset data files.

7. The method of claim 1, wherein tracking distributing comprises:
registering the multimedia asset data file in order to identify the multimedia asset data file, wherein registering the multimedia asset data file comprises:
assigning a provider identifier to the content provider, and
assigning a unique identifier to the multimedia asset data file provided by the content provider based upon the provider identifier and a provider asset identification, the provider asset identification being included with the multimedia asset data file by the content provider.

8. The method of claim 1, wherein tracking distributing comprises:
    tracking transmission of a plurality of elements of the multimedia asset data file to the MSO using a pitcher appliance;
    tracking receipt of the elements of the multimedia asset data file using a catcher appliance; and
    receiving an alarm signal if one of the elements of the multimedia asset data file is not successfully received by the catcher appliance.

9. The method of claim 1, wherein tracking uploading comprises:
    providing an asset locator identifying the multimedia asset data file to the VOD server;
    providing a schedule to the VOD server comprising instructions for the VOD server to request the multimedia asset data file from a catcher and the metadata; and
    tracking retrieval of the multimedia asset data file and associated metadata by initiating file transfer using the asset locator.

10. The method of claim 9 wherein the file transfer is a file transfer protocol ("FTP") transfer.

11. The method of claim 9, wherein the asset locator is an asset Uniform Resource Locator (URL).

12. The method of claim 1, wherein tracking uploading comprises:
    providing an asset locator identifying an element of the multimedia asset data file to the VOD server, the VOD server submitting the asset locator to a catcher appliance;
    tracking transmission of the element from the catcher appliance to the VOD server using the asset locator to retrieve the element.

13. The method of claim 12, wherein tracking uploading further comprises:
    receiving an alarm signal from the VOD server if the element is not properly received.

14. The method of claim 13, wherein tracking uploading further comprises performing a follow-up or diagnosis upon receiving the alarm indicating that the element is not properly received.

15. The method of claim 1, wherein providing usage reports comprises:
    receiving from the VOD server data on feature elements requested by end users of the MSO;
    creating a master reporting database using the data on feature elements requested by end users; and
    generating a usage report using the data contained in the master reporting database.

16. The method of claim 15, wherein providing usage reports further comprises:
    restricting access by a content provider to the data contained in the master reporting database using the business rules provided by the MSO.

17. The method of claim 15, wherein providing usage reports further comprises:
    analyzing the usage report to determine end user viewing characteristics; and
    generating an advertising play list targeted to an end user based upon the viewing characteristics of the end user, wherein the advertising play list comprises advertising selected based upon the viewing characteristics of the end user.

18. The method of claim 17, wherein providing usage reports further comprises:
    supplementing a multimedia asset data file with data contained in the usage report, wherein the usage report comprises usage data for the multimedia asset data file.

19. The method of claim 15, wherein providing usage reports further comprises:
    analyzing the usage report to determine end user viewing characteristics;
    selecting multimedia asset data files based upon end user viewing characteristics; and
    performing a campaign management function chosen from the group consisting of bundling selected multimedia asset data files, setting pricing for selected multimedia asset data files, and setting promotions for selected multimedia asset data files.

20. A method performed by a processor-based device, the method comprising:
    receiving, by a video-on-demand ("VOD") management system, a plurality of multimedia asset data files having content elements from a plurality of content providers;
    receiving, by VOD management system, metadata associated with the content elements in the plurality of multimedia asset data files from at least one of the plurality of content providers, the metadata comprises information on at least accuracy of delivery of the multimedia asset data files as determined by a catcher appliance receiving the multimedia asset data files from a pitcher appliance, wherein the metadata further comprises a default pricing associated with a multimedia asset data file of the multimedia asset data files;
    receiving business rules provided by a multiple service or systems operator (MSO), the business rules corresponding to the multimedia asset data file and being identified with the MSO, wherein the business rules comprise pricing rules;
    determining, by the VOD management system, whether a customized pricing has been assigned to the multimedia asset data file by the MSO,
    wherein in response to the determining that the customized pricing has been assigned to the multimedia asset data file by the MSO, the assigned customized pricing is used instead of the default pricing, and
    in response to the determining that the customized pricing has not been assigned to the multimedia asset data file, the default pricing is used if an override price has not been assigned;
    coordinating uploading the multimedia asset data files to VOD servers maintained by the MSO, at the VOD management system, using an asset locator assigned to each multimedia asset data file;
    tracking distributing the multimedia asset data files from the content provider to the MSO; and
    tracking uploading the multimedia asset data files from the MSO to the VOD servers.

21. The method of claim 20, further comprising:
    validating the multimedia asset data files by determining if the received metadata and multimedia asset data files comply with business rules provided by the MSO.

22. The method of claim 20, wherein coordinating uploading comprises:
    coordinating uploading the associated metadata for the multimedia asset data files to the VOD servers;
    distributing a localized master schedule to each MSO; and
    providing a schedule update to each MSO at regular intervals.

23. The method of claim 22, wherein tracking comprises:
tracking uploading the multimedia asset data files and the associated metadata to the VOD servers by reference to each MSO's localized master schedule.

24. The method of claim 22, wherein each schedule update comprises instructions for inserting and deleting multimedia asset data files from each MSO's localized master schedule.

25. A method performed by a processor-based device, the method comprising:
ingesting, by a video-on-demand ("VOD") management system, content and metadata associated with the content provided by a content provider, wherein the metadata further comprises a default pricing associated with the content;
coordinating, by the VOD management system, distribution of the metadata and the content, the distribution using a pitcher and a catcher, the pitcher transferring the content to a multiple service or systems operator (MSO) and the catcher receiving the content;
coordinating uploading the metadata and the content to a server, according to scheduling and business rules provided by the MSO, for delivery to an end user;
determining, by the VOD management system, whether a customized pricing has been assigned to the content by a multiple service or systems operator (MSO) based on the business rules provided by the MSO, wherein the business rules comprise pricing rules,
wherein in response to the determining that the customized pricing has been assigned to the content by the MSO, the assigned customized pricing is used instead of the default pricing, and
in response to the determining that the customized pricing has not been assigned to the content, the default pricing is used if an override price has not been assigned; and
tracking distributing the content from the content provider to the MSO; and
tracking uploading the content from the MSO to the VOD server;
wherein the pitcher and the catcher comprise separately implemented appliances communicating over a network with the processor-based device.

26. The method of claim 25 further comprising:
providing visibility into usage of the content.

27. The method of claim 26 wherein providing visibility into usage of the content comprises:
preparing a usage report; and
providing access to the usage report to a multiple service or systems operator (MSQ) or a content provider.

28. The method of claim 27 wherein preparing the usage report comprises:
creating a master reporting database including usage information from across a MSQ network.

29. The method of claim 28 wherein preparing the usage report further comprises:
exporting the usage report to an analysis system.

30. The method of claim 25 wherein ingesting comprises:
registering the content; and
coordinating accessing the content located in one of an internal location and an external location.

31. The method of claim 30 wherein registering the content comprises:
assigning a provider identifier to the content provider; and
assigning a globally unique identifier to the content based on the provider identifier and a provider asset identifier.

32. The method of claim 25 wherein ingesting comprises:
receiving the business rules from the MSO; and
validating the metadata and the content using the business rules.

33. The method of claim 32 wherein receiving the business rules comprises:
receiving the business rules including at least one of a rating filter, a pricing rule, a category rule, and a platform conversion rule.

34. The method of claim 25 wherein ingesting comprises:
customizing an electronic program guide (EPG).

35. The method of claim 25 wherein ingesting comprises:
providing an interface to allow a user to view and analyze metadata and scheduling information associated with the content.

36. The method of claim 25 wherein coordinating the distribution comprises:
interacting with an asset distribution system (ADS) to facilitate delivery of the content from a content provider to the MSO, the ADS including the pitcher and the catcher.

37. The method of claim 36 wherein interacting with the ADS comprises:
receiving information regarding when a transmission of an element of the content is initiated from the pitcher;
requesting retransmission of the element if an alarm is received from the catcher; and
tracking a request from a server to release the content received by the catcher.

38. The method of claim 25 wherein coordinating uploading comprises:
receiving a schedule request from the server;
providing a customized or localized master schedule for the MSO to the server, the master schedule having an asset locator;
receiving a metadata locator corresponding to the content from the server;
providing an asset locator to the server in response to the metadata locator, the server retrieving an element of the content from a catcher using the asset locator; and
interacting with the server during transfer of the element of the content from the catcher to the server.

39. The method of claim 35 wherein providing the asset locator comprises:
re-transmitting the asset locator upon receiving an alarm from the server indicating that the asset locator is not received properly by the server.

40. The method of claim 35 wherein interacting with the server comprises:
performing a follow-up or diagnosis upon receiving an alarm from the server indicating that the element is not received properly by the server.

41. A content management system comprising:
an external layer to interface to an application client;
a component programmatic application program interface (API) coupled to the external layer to interface to a plurality of engines comprising:
a workflow engine to manage workflows of
ingesting a content and metadata associated with the content provided by a content provider, wherein the metadata further comprises a default pricing associated with the content,
coordinating distribution of the metadata and the content,
coordinating uploading the metadata and the content to a server, according to scheduling and business rules provided by a multiple service or systems operator (MSO), for delivery to an end user, tracking distributing the content from the content provider to the MSO; and tracking uploading the content from the MSO to the VOD server;

a relational database to store the metadata; and a business objects engine to managing business rules associated with the content, the business rules being provided by the MSO, wherein the business rules comprise pricing rules, and the business objects engine further determines whether a customized pricing has been assigned to the content by the MSO, wherein in response to the determining that the customized pricing has been assigned to the content by the MSO, the assigned customized pricing is used instead of the default pricing, and in response to the determining that the customized pricing has not been assigned to the content, the business objects engine assigns an override price to the default pricing is used if an override price has not been assigned.

42. The system of claim 41 wherein the plurality of engines further comprises:
a package engine to manage packaging the content;
a scheduling engine to schedule deployment of the content;
a platform converter engine to customize an electronic program guide (EPG) designated by the MSO; and
a localization engine to localize the content.

43. The system of claim 41 wherein the external layer comprises:
a Web service API to facilitate communication with an application used by one of the MSO and the content provider.

44. The system of claim 43 wherein the Web service API performs operations comprising:
registering the content;
receiving a confirmation call from one of a pitcher and a catcher regarding status of transfer of an element of the content; and
receiving a schedule request from the server for a schedule to distribute or upload the content.

45. The system of claim 44 wherein the Web service API further performs operations comprising:
receiving a metadata request from the server for localized package metadata; and
receiving a reporting call from the server to deliver usage report.

46. A system comprising:
a server;
a distribution network coupled to the server to distribute a content provided by a content provider; and
a content management system coupled to the server and the distribution network, the content management system comprising:
an external layer to interface to an application client;
a component programmatic application program interface (API) coupled to the external layer to interface to a plurality of engines comprising:
a workflow engine to manage workflows of
ingesting the content and metadata associated with the content,
coordinating distribution of the metadata and the content, and
coordinating uploading the metadata and the content to the server, according to scheduling and business rules provided by a multiple service or systems operator (MSO), for delivery to an end user, tracking distributing the content from the content provider to the MSO; and tracking uploading the content from the MSO to the server;

a relational database to store the metadata; and a business objects engine to managing business rules associated with the content, the business rules being provided by the MSO, wherein the business rules comprise pricing rules, and the business objects engine further determines whether a customized pricing has been assigned to the content by the MSO, wherein in response to the determining that the customized pricing has been assigned to the content by the MSO, the assigned customized pricing is used instead of the default pricing, and in response to the determining that the customized pricing has not been assigned to the content, the default pricing is used if an override price has not been assigned.

47. The system of claim 46 wherein the plurality of engines further comprises:
a package engine to manage packaging the content;
a scheduling engine to schedule deployment of the content;
a platform converter engine to customize an electronic program guide (EPG) designated by the MSO; and
a localization engine to localize the content.

48. The system of claim 46 wherein the external layer comprises:
a Web service API to facilitate communication with an application used by one of the MSO and the content provider.

49. The system of claim 48 wherein the Web service API performs operations comprising:
registering the content;
receiving a confirmation call from one of a pitcher and a catcher regarding status of transfer of an element of the content; and
receiving a schedule request from the server for a schedule to distribute or upload the content.

50. The system of claim 49 wherein the Web service API further performs operations comprising:
receiving a metadata request from the server for localized package metadata; and
receiving a reporting call from the server to deliver usage report.

51. The system of claim 46 wherein the distribution network comprises:
a pitcher used by the content provider to transmit the content and the metadata to the MSO via a distribution channel;
a catcher used by the MSO to receive transmission from the pitcher via a downlink channel.

52. The system of claim 51 wherein the distribution channel comprises a satellite uplink facility and the downlink channel comprises a satellite downlink facility.

53. The system of claim 51 wherein one of the pitcher and the catcher communicates with the content management system via a network connection.

54. The system of claim 51 wherein the catcher receives the content locally using one of a physical medium, a local network, and a terrestrial-based network.

55. The system of claim 46 wherein the content is one of a video-on-demand (VOD) content, an asset data file, a broadband content, and a network content.

* * * * *

UNITED STATES PATENT AND TRADEMARK OFFICE
CERTIFICATE OF CORRECTION

PATENT NO. : 9,027,063 B2  
APPLICATION NO. : 10/718376  
DATED : May 5, 2015  
INVENTOR(S) : Fickle et al.

Page 1 of 1

It is certified that error appears in the above-identified patent and that said Letters Patent is hereby corrected as shown below:

In the CLAIMS:
Claim 25, column 21, line 39, delete "server;" and insert --server,--.
Claim 27, column 21, line 49, delete "(MSQ)" and insert --(MSO)--.
Claim 28, column 21, line 53, delete "MSQ" and insert --MSO--.
Claim 37, column 22, lines 26-28, delete "catcher; and tracking a request from a server to release the content received by the catcher." and insert --catcher.--.
Claim 39, column 22, line 42, delete "claim 35" and insert --claim 38--.
Claim 40, column 22, line 47, delete "claim 35" and insert --claim 38--.

Signed and Sealed this
Eighth Day of December, 2015

Michelle K. Lee
*Director of the United States Patent and Trademark Office*